(12) United States Patent
Matsunaga et al.

(10) Patent No.: US 7,424,352 B2
(45) Date of Patent: Sep. 9, 2008

(54) DRIVING SITUATION DETECTION SYSTEM

(75) Inventors: Takanori Matsunaga, Tokyo (JP); Marcus Hiemer, Karlsruhe (DE)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 481 days.

(21) Appl. No.: 11/046,726

(22) Filed: Feb. 1, 2005

(65) Prior Publication Data

US 2006/0095167 A1    May 4, 2006

(30) Foreign Application Priority Data

Nov. 1, 2004    (JP)    ............... 2004-318049

(51) Int. Cl.
*A01B 69/00* (2006.01)
*B62D 6/00* (2006.01)
*G05D 1/00* (2006.01)

(52) U.S. Cl. ................ 701/42; 701/43; 701/44; 701/41

(58) Field of Classification Search ........ 701/1, 701/41, 58, 69, 70, 71, 72, 73, 74, 75, 76, 701/77, 78, 79
See application file for complete search history.

(56) References Cited

U.S. PATENT DOCUMENTS 5,711,023 A * 1/1998 Eckert et al. ............ 701/70

6,134,509 A * 10/2000 Furusho et al. ............ 702/167

FOREIGN PATENT DOCUMENTS

| DE | 198 51 978 A1 | 5/2000 |
| DE | 100 39 782 A1 | 2/2002 |
| EP | 1 000 838 A2 | 5/2000 |

* cited by examiner

*Primary Examiner*—Khoi H. Tran
*Assistant Examiner*—Bhavesh Amin
(74) *Attorney, Agent, or Firm*—Sughrue Mion, PLLC

(57) ABSTRACT

A driving situation detection system capable of detecting driving situations swiftly with high reliability is obtained. The driving situation detection system includes real curve arithmetic means reference vehicle model and observer means, a differentiator unit, a model curve radius arithmetic means, and an assessment unit. The arithmetic means generates real curve radius signals based on wheel speeds. The reference vehicle model and observer means processes input signals utilizing a linear reference model to generate a yaw rate signal and a vehicle body side slip angle signal. The unit differentiates the vehicle body side slip angle signal to generate a vehicle body side slip rate signal. The model curve radius arithmetic means generates a model curve radius signal based on the yaw rate signal and the vehicle body side slip rate signal. The assessment unit detects undesirable driving situations by comparing the real curve radius and the model curve radius.

2 Claims, 4 Drawing Sheets

FIG. 4

| $\delta w$ | $\frac{1}{\gamma_{model}}$ | $\frac{1}{\gamma_{meas}}$ | SI |
|---|---|---|---|
| STRAIGHT | | | |
| $\|\delta w\| \leq \delta_{w,th}$ | $-\infty < \frac{1}{\gamma_{model}} < \infty$ | $\frac{1}{\gamma_{model}} - \Delta n_1 < \frac{1}{\gamma_{meas}} < \frac{1}{\gamma_{model}} + \Delta p_1$ | 1 |
| | | $(\frac{1}{\gamma_{meas}} \geq \frac{1}{\gamma_{model}} + \Delta p_1) \vee (\frac{1}{\gamma_{meas}} \leq \frac{1}{\gamma_{model}} - \Delta n_1)$ | 2 |
| LEFT CURVE | | | |
| $\|\delta w\| \leq \delta_{w,th}$ | $\frac{1}{\gamma_{model}} \geq 0$ | $\frac{1}{\gamma_{model}} - \Delta n_1 < \frac{1}{\gamma_{meas}} < \frac{1}{\gamma_{model}} + \Delta P_1$ | 3 |
| | | $(\frac{1}{\gamma_{meas}} \leq \frac{1}{\gamma_{model}} - \Delta n_1) \wedge (\frac{1}{\gamma_{meas}} \geq -\Delta n_2)$ | 4 |
| | | $\frac{1}{\gamma_{meas}} \geq \frac{1}{\gamma_{model}} + \Delta p_1$ | 5 |
| | | $(\frac{1}{\gamma_{meas}} \leq \frac{1}{\gamma_{model}} - \Delta n_1) \wedge (\frac{1}{\gamma_{meas}} \leq -\Delta n_2)$ | 6 |
| RIGHT CURVE | | | |
| | $\frac{1}{\gamma_{model}} < 0$ | $\frac{1}{\gamma_{model}} - \Delta n_1 < \frac{1}{\gamma_{meas}} < \frac{1}{\gamma_{model}} + \Delta P_1$ | 3 |
| | | $(\frac{1}{\gamma_{meas}} \geq \frac{1}{\gamma_{model}} + \Delta p_1) \wedge (\frac{1}{\gamma_{meas}} < -\Delta p_2)$ | 4 |
| | | $\frac{1}{\gamma_{meas}} \leq \frac{1}{\gamma_{model}} - \Delta n_1$ | 5 |
| | | $(\frac{1}{\gamma_{meas}} \geq \frac{1}{\gamma_{model}} + \Delta p_1) \wedge (\frac{1}{\gamma_{meas}} \geq -\Delta p_2)$ | 6 |

STABILITY INDICATOR SI

DRIVING SITUATION DETECTION SYSTEM

BACKGROUND OF THE INVENTION

1. Field of the Invention

The present invention relates to a driving situation detection system for detecting and assessing undesirable driving situations in general driving operation. In particular, the present invention relates to a technique for detecting driving situations swiftly with high reliability.

2. Description of the Related Art

In general, order to detect undesirable driving situations, the deviation of the real driving behavior from a linear reference driving behavior is assessed.

Since the majority of vehicle drivers rarely leaves the linear range, if the vehicle behavior becomes nonlinear, the driver of the vehicle has a problem of controlling the vehicle (the driving situation is undesirable).

Usually, a linear reference model of the vehicle is executed to cover the field of experience of the majority of drivers. In this case, the yaw velocity generated by the reference model is compared to the real, measured yaw velocity. Based on the deviation between the two yaw velocities the driving situation is assessed (see EP 1 000 838 A2 and DE 198 51 978 A1, for example).

A system using the vehicle body side slip angle is proposed as an approach other than the driving behavior assessing means (See DE 100 39 782 A1, for example).

In conventional driving situation detection systems, detection of driving situations is carried out simply by assessing the deviation of the real driving behavior from a reference driving behavior. Therefore, detection results cannot be obtained swiftly with sufficiently high reliability.

SUMMARY OF THE INVENTION

The present invention has been made to solve the problems described above, and an object of the present invention is therefore to provide a driving situation detection system in which, in light of the state of the art, an alternate approach is adopted for detecting undesirable situations to obtain detection results swiftly with sufficiently high reliability.

A driving situation detection system according to the present invention includes real curve radius arithmetic means, reference vehicle model and observer means, a differentiator unit, model curve radius arithmetic means, and an assessment unit, in which: the real curve radius arithmetic means calculates a real curve radius and a cornering direction of a running vehicle; the reference vehicle model and observer means includes a linear reference model of the vehicle and a state space observer for estimating variable which cannot be measured directly, and calculates a vehicle body side slip angle of the vehicle using the linear reference model and the state space observer; the differentiator unit differentiates the vehicle body side slip angle to calculate a vehicle body side slip rate; the model curve radius arithmetic means calculates a model curve radius and an algebraic sign of the model curve radius based on the vehicle body side slip rate and a yaw rate; and the assessment unit generates assessment information about a driving situation of the vehicle by comparing the model curve radius and the real curve radius of the vehicle.

According to the present invention, a curve radius signal determined by evaluating the individual wheel speed sensors of a vehicle is compared with a curve radius signal determined using a linear reference model with a state space observer. Based on the curve radius deviation between the two signals, the undesirable driving situations can be detected. Moreover, evaluation of the deviation allows the driving situations to be categorized in detail.

BRIEF DESCRIPTION OF THE DRAWINGS

In the accompanying drawings:

FIG. 4 is an explanatory diagram showing conditions of the driving situation categorization according to embodiment 1 of the present invention.

DESCRIPTION OF THE PREFERRED EMBODIMENTS

Embodiment 1

Figure 1:
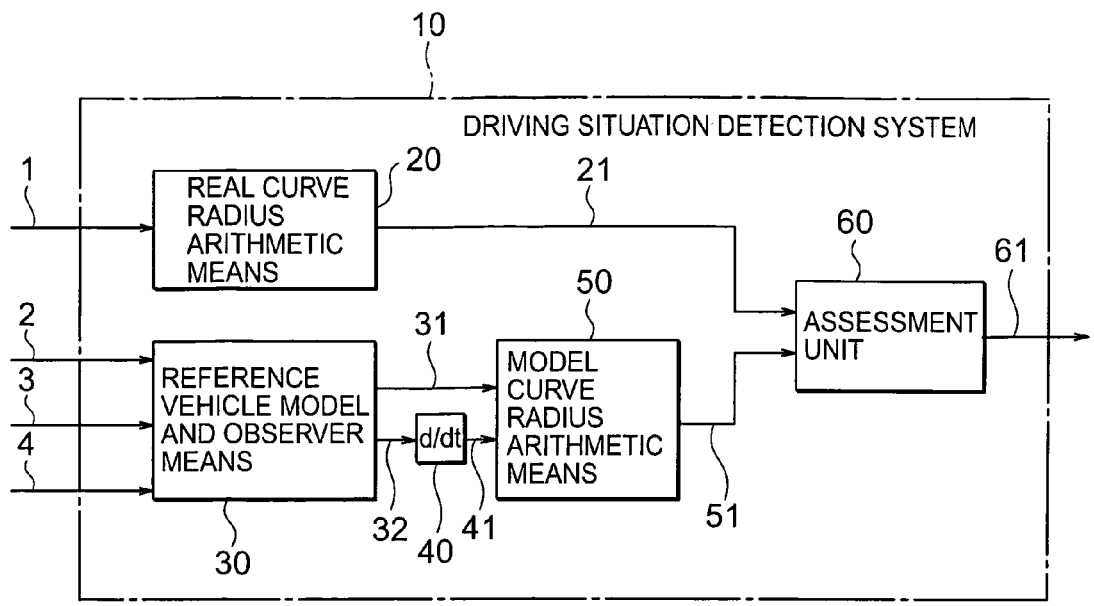
FIG. 1 is a block diagram showing a driving situation detection system according to embodiment 1 of the present invention.

FIG. 1 is a block diagram of a driving situation detection system 10 according to embodiment 1 of the present invention.

In FIG. 1, the driving situation detection system 10 includes real curve radius arithmetic means 20, reference vehicle model and observer means 30, a differentiator unit 40, model curve radius arithmetic means 50, and an assessment unit 60.

A plurality of signals 1 to 4 as sensor data obtained from a standard vehicle are inputted to the driving situation detection system 10.

Wheel speed sensor signals 1 indicating a plurality of wheel speeds vR of respective wheels are inputted to the real curve radius arithmetic means 20.

A vehicle speed sensor signal 2 indicating a vehicle speed v, a yaw rate sensor signal 3 indicating a yaw rate $\psi'$, a steering wheel angle sensor signal 4 indicating a steering wheel angle $\theta$ are inputted to the reference vehicle model and observer means 30.

The real curve radius arithmetic means 20 calculates a real (actual) curve radius and a cornering direction of a currently running vehicle based on the plurality of vehicle speed sensor signals 1. A real curve radius (rmeas) signal 21 generated by the real curve radius arithmetic means 20 is inputted to the assessment unit 60.

The reference vehicle model and observer means 30 includes a linear reference model of the vehicle and a state space observer for estimating variables which cannot be measured directly. The reference vehicle model and observer means 30 processes the respective input signals 2, 3, 4 to calculate the yaw rate $\psi'$ and the vehicle body side slip angle (VBSSA) $\beta$.

A yaw rate signal 31 and a vehicle body side slip angle signal 32 generated by the reference vehicle model and observer means 30 are inputted to the model curve radius arithmetic means 50 and the differentiator unit 40, respectively.

The differentiator unit 40 differentiates the vehicle body side slip angle β to calculate the vehicle body side slip rate β', and inputs a vehicle body side slip rate signal 41 to the model curve radius arithmetic means 50.

The model curve radius arithmetic means 50 calculates the model curve radius rmodel and the algebraic sign of the model curve radius rmodel based on the yaw rate ψ' and the vehicle body side slip rate β'.

A model curve radius (rmodel) signal 51 generated by the model curve radius arithmetic means 50 is inputted to the assessment unit 60.

The assessment unit 60 compares the current real curve radius rmeas and the modelled curve radius rmodel to categorize the current driving situation based on thresholds defined for driving stability, and detects an undesirable driving situation. Then, the assessment unit 60 outputs assessment information 61 regarding the driving situation of the vehicle.

More specifically, the real curve radius arithmetic means 20 processes deviations in the wheel speed sensor signals 1 in cornering situations to achieve the curve radius of the vehicle center of gravity.

In cornering situations, the wheel speeds of the outer track are larger than those of the inner track. Therefore, the real curve radius arithmetic means 20 analyzes the wheel speed sensor signals 1 of the inner and outer tracks to detect the curve radius and the cornering direction (clockwise or counterclockwise).

The reference vehicle model and observer means 30 executes a linear single track state space model (linear reference model of the vehicle). State space model theory is widespread and familiar to those skilled in control theory.

The state space equations of the linear single track model are expressed by the following equations (1), (2).

[Equation 1] (1)
$$x' = \begin{bmatrix} \psi'' \\ \beta' \end{bmatrix} = \begin{bmatrix} -\dfrac{c_{sF}l_F^2 + c_{sR}l_R^2}{J_Z v} & \dfrac{c_{sR}l_R - c_{sF}l_F}{J_Z} \\ \dfrac{c_{sR}l_R - c_{sF}l_F}{mv^2} - 1 & -\dfrac{c_{sF} + c_{sR} + m\dot{v}}{mv} \end{bmatrix} \begin{bmatrix} \psi' \\ \beta \end{bmatrix} + \begin{bmatrix} \dfrac{c_{sF}l_F}{J_Z} \\ \dfrac{c_{sF}}{mv} \end{bmatrix} \delta_W$$

[Equation 2] (2)
$$y = [1, 0] \cdot \begin{bmatrix} \psi' \\ \beta \end{bmatrix}$$

In equation (1), ψ' denotes the yaw rate, and β denotes the vehicle body side slip angle. The yaw rate ψ' and the vehicle body side slip angle (VBSSA) β are the state variables of the driving situation detection system 10.

All other terms in equation (1) are constant parameters apart from the vehicle velocity v (which is time variant).

Namely, csF and csR denote the cornering stiffnesses of front and rear wheels, and lF and lR denote the distances of front and rear axles to the vehicle center of gravity. Further, m denotes the vehicle mass and Jz denotes the mass moment of inertia about the vertical vehicle axis.

The vehicle body side slip angle β is an important variable to determine the model curve radius rmodel. However, it is difficult to measure the vehicle body side slip angle β directly.

Therefore, the reference vehicle model and observer means 30 contains the state space observer to estimate the vehicle body side slip angle (VBSSA) β. Observer theory is familiar to those skilled in control theory.

Employing the state space observer, the reference vehicle model and observer means 30 generates the yaw rate signal 31 indicating the yaw rate ψ' and the vehicle body side slip angle signal 32 indicating the vehicle body side slip angle (VBSSA) β.

The yaw rate signal 31 and the vehicle body side slip angle signal 32 thus obtained are generated based on the linear reference model and will therefore deviate from the respective real (i.e., measured) values in undesirable driving situations.

The differentiator unit 40 differentiates the vehicle body side slip angle (VBSSA) β with respect to time to calculate the vehicle body side slip rate (VBSSR) β', and generates the vehicle body side slip rate signal 41.

The modelled yaw rate signal 31 and the vehicle body side slip rate signal 41 are inputted to the model curve radius arithmetic means 50.

The model curve radius arithmetic means 50 calculates the curve radius reference model rmodel which is modelled according to the above-mentioned linear reference model to generate the model curve radius signal 51, by using the relation defined by the following equation (3).

[Equation 3] (3)
$$r_{model} = \dfrac{v}{\beta' + \psi'}$$

Here, the modelled curve radius rmodel is calculated on the basis of a linear vehicle behavior.

On the other hand, the real curve radius arithmetic means 20 calculates the real curve radius rmeas by processing the plurality of wheel speed sensor signals 1.

Therefore, if the vehicle is in an undesirable driving situation, the model curve radius signal 51 will deviate from the real curve radius (rmeas) signal 21.

The assessment unit 60 compares the real, measured curve radius (rmeas) signal 21 with the modelled curve radius (rmodel) signal 51.

At this time, the assessment unit 60 categorizes the driving situation based on thresholds defined in advance, whereby an undesirable driving situation can be detected.

The assessment information 61 generated by the assessment unit 60 contains a categorization of the driving situation.

Figure 2:
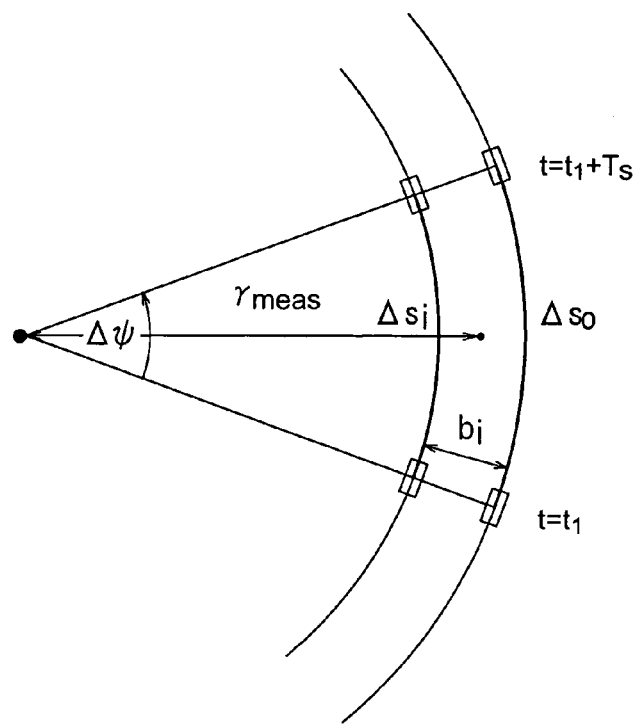
FIG. 2 is an explanatory diagram showing the calculation of the curve radius using a plurality of wheel sensor signals by real curve radius arithmetic means according to embodiment 1 of the present invention.

FIG. 2 shows as explanatory diagram showing arithmetic processing of the curve radius rmeas using the plurality of wheel speed sensor signals 1 by the real curve radius arithmetic means 20.

For simplicity of description, FIG. 2 contains only the two wheels of the front axle, whereas those of the rear axle are not illustrated.

In FIG. 2, Δψ represents the yaw angle increment between two successive sampling points "t1" and "t1+TS".

Rmeas represents the actual curve radius of the vehicle with respect to the vehicle center of gravity.

Δsi and Δso are the distance increments of the inner and outer tracks driven between above two successive sampling points.

Integrating the wheel speeds vRi of inner track and vRo of outer track over one sampling period TS yields the distance increment of the inner track Δsi and the distance increment of the outer track Δso as represented by the following equation (4).

[Equation 4]

$$\Delta s_i = v_{R:i} \cdot T_S \qquad (4)$$
$$\Delta s_o = v_{Ro} \cdot T_S$$

The distance increment of the inner track Δsi and the distance increment of the outer track Δso can also be represented by the following equation (5).

[Equation 5]

$$\Delta s_i = \left(r_{meas} - \frac{b_i}{2}\right) \cdot \Delta \psi \qquad (5)$$
$$\Delta s_o = \left(r_{meas} + \frac{b_i}{2}\right) \cdot \Delta \psi$$

Further, by eliminating Δψ from the equation (5), the real curve radius rmeas can be obtained as represented by the following equation (6).

[Equation 6]

$$r_{meas} = \frac{b_i}{2}\left(\frac{\Delta s_i + \Delta s_o}{\Delta s_o - \Delta s_i}\right) \qquad (6)$$

The actually measured curve radius rmeas according to the equation (6) is outputted by the real curve radius arithmetic means 20, and inputted as the real curve radius signal 21 to the assessment unit 60.

Figure 3:
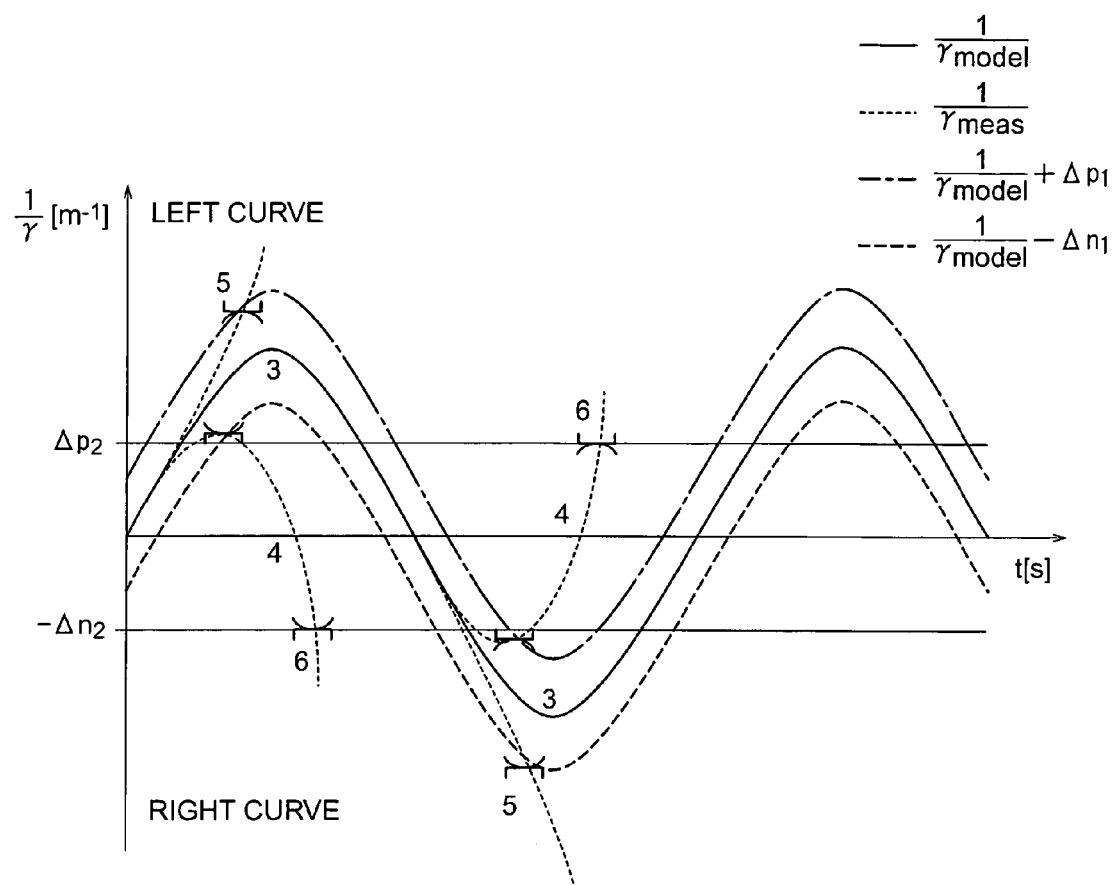
FIG. 3 is an explanatory diagram showing the tolerance band around the modelled curve radius as a basis for driving situation categorization according to embodiment 1 of the present invention.

FIG. 3 is an explanatory diagram showing the tolerance band around the curve radius rmodel modelled by the model curve radius arithmetic means 50.

In FIG. 3, for simplification, the inverse curve radius 1/rmodel (see solid line) and the inverse curve radius 1/rmeas (see broken line) are sketched to avoid singularities for straight forward driving where the curve radius is infinitely large.

In FIG. 3, the horizontal axis indicates the time [sec], and the vertical axis indicates the inverse curve radius (driving situation) 1/r [m$^{-1}$]. Δn1, Δn2, Δp1, and Δp2 are stability thresholds (which are time constant) to categorize the driving situations.

Further, parentheses and brackets in FIG. 3 indicate boundaries of ranges corresponding to the respective curves. Specifically, upwardly opening brackets indicate "not less than". Downwardly opening brackets indicate "not more than". Upwardly opening parentheses indicate "greater than". Downwardly opening parentheses indicate "less than".

The basic idea is to check whether the real curve radius (rmeas) signal 21 lies within certain band around the modelled curve radius (rmodel) signal 51.

If the real curve radius rmeas lies within the band around the modelled curve radius rmodel, the driving station is rated stable.

If the deviation from the model curve radius rmodel is too large and shows certain peculiarities, the respective driving situations can be categorized.

For example, if the algebraic sign of the modelled curve radius signal 51 is different from the algebraic sign of the measured curve radius signal 21, this indicates an instable situation ("breakout") or a situation ("countersterring") where the driver steers in one direction whereas the vehicle turns into the other direction.

FIG. 4 is an explanatory diagram in form of a table used in the assessment unit 60 associated with FIG. 3, showing conditions which characterize driving situations by means of a stability indicator (SI).

FIG. 4 shows driving situations, i.e., stable straight forward "SI=1", instable straight forward "SI=2", stable curve "SI=3", understeer "SI=4", oversteer "SI=5", and breakout "SI=6" associated with the respective conditions (see FIG. 3 as for SI=3, 4, 5, 6).

There are other possible ways to categorize a driving situation, for instance a real number representing a "degree of nonliniarity".

In this manner, using the wheel speeds, the actually driven curve radius rmeas is compared to a curve radius rmodel determined by a linear reference model. Special wheel speed patterns yield large deviations from the model curve radius rmodel.

The effect of the wheel speed patterns is detected so that an earlier detection of undesirable driving situations can be carried out compared to existing methods.

Figure 5:
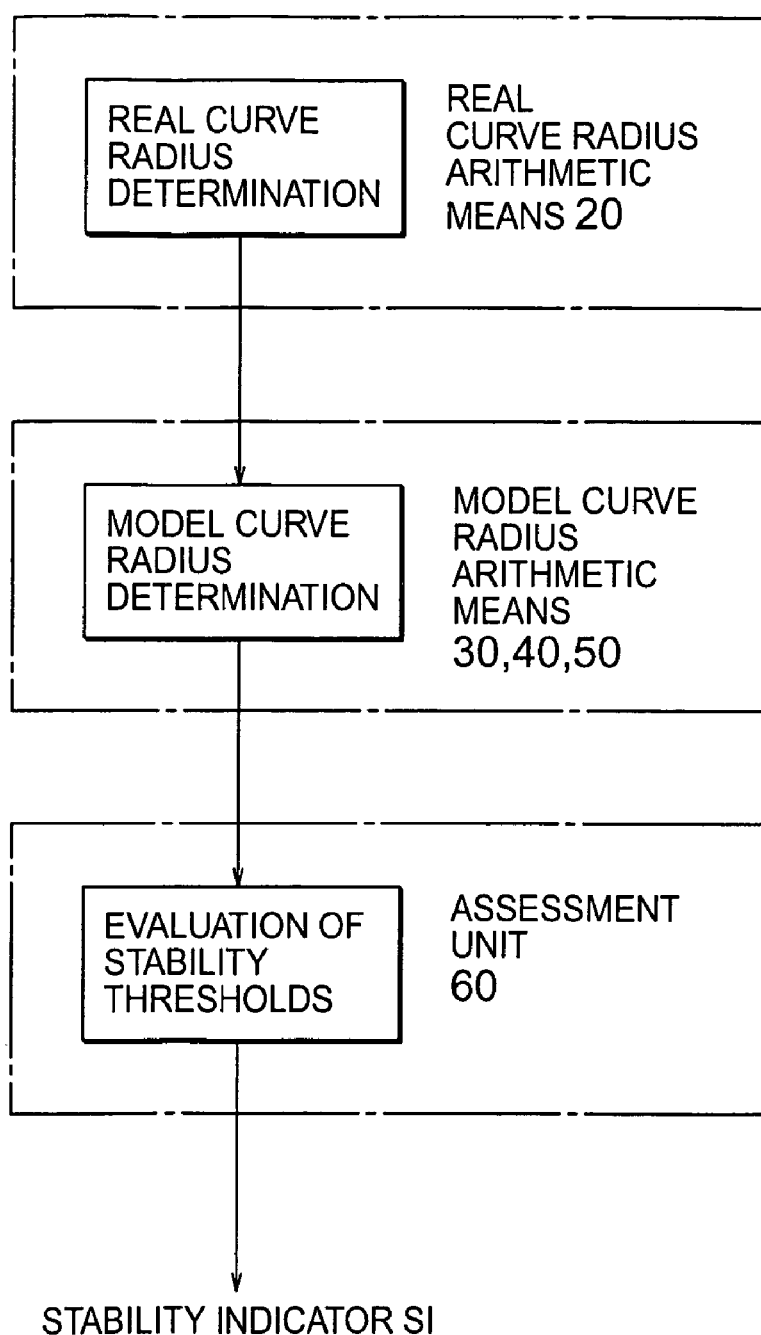
FIG. 5 is a flow chart of the calculations carried out by the driving situation detection system according to embodiment 1 of the present invention.

FIG. 5 is a flow chart showing processes of driving situation assessment according to embodiment 1 of the present invention which are associated with blocks in FIG. 1.

In FIG. 5, after calculating the real curve radius rmeas by the real curve radius arithmetic means 20, the model curve radius rmodel is calculated by the reference vehicle model and observer means 30, the differentiator unit 40, and the model curve radius arithmetic means 50.

Both the modelled curve radius rmodel and the measured curve radius rmeas are afterwards applied to the assessment unit 60, where the radii rmeas and rmodel are compared and evaluated with stability thresholds.

The evaluation results of the assessment information 61 are outputted as the assessment information 61 including the stability indicator SI about the driving situation.

The whole signal flow occurs every sampling step and can be executed in real-time or offline on standard microprocessors.

As described above, the driving situation detection system 10 compares the curve radius (rmeas) signal 21 obtained by analyzing the individual sensor signals of the vehicle and the curve radius (rmodel) signal 51 determined using the linear reference model with the state space observer, and detects the undesirable driving situations based on the deviation between the curve radius indicated by the curve radius (rmeas) signal 21 and the curve radius indicated by the curve radius (rmodel) signal 51.

Further, the driving situations are categorized by assessing the deviation of the curve radius based on the assessment information 61.

Namely, the assessment unit 60 characterizes the respective driving situation by means of the stability indicator SI and assesses its degree of instability.

Compared to existing methods, processing the wheel speed sensor signals 1 is advantageous because early detection of upcoming vehicle instabilities can be achieved.

When the actually driven curve radius rmeas is compared to a curve radius rmodel determined by a linear reference model using the wheel speeds, special wheel speed patterns yield large deviations in the curve radius. Therefore, an earlier detection of undesirable driving situations can be carried out compared to existing methods.

Thus, according to embodiment 1 of the present invention, for example, it is possible to achieve a highly advanced vehicle stability control.

That means, by evaluating the radius deviation, undesirable driving situations such as understeer or oversteer can be detected and categorized.

Knowing undesirable driving situations, for instance control algorithms can be executed to stabilize the vehicle.

Further, the driving situation detection system 10 according to the present invention is applicable to an accident data recorder for accident reconstruction (analysis) purposes.

In the application, detection of the undesirable situations triggers to freeze the data recording process in the accident data recorder.

What is claimed is:

1. A driving situation detection system, comprising real curve radius arithmetic means, reference vehicle model and observer means, a differentiator unit, model curve radius arithmetic means, and an assessment unit, wherein:
   the real curve radius arithmetic means calculates a real curve radius and a cornering direction of a running vehicle;
   the reference vehicle model and observer means includes a linear reference model of the vehicle and a state space observer for estimating variable which cannot be measured directly, and calculates a vehicle body side slip angle of the vehicle using the linear reference model and the state space observer;
   the differentiator unit differentiates the vehicle body side slip angle to calculate a vehicle body side slip rate;
   the model curve radius arithmetic means calculates a model curve radius and an algebraic sign of the model curve radius based on the vehicle body side slip rate and a yaw rate; and
   the assessment unit generates assessment information about a driving situation of the vehicle by comparing the model curve radius and the real curve radius of the vehicle,
   wherein the model curve radius arithmetic means determines the model curve radius by the following equation:

$$r_{model} = \frac{v}{\beta' + \psi'}$$

where $r_{model}$ represents the model curve radius, v represents the vehicle's center of gravity velocity, $\beta'$ represents the vehicle body side slip rate determined using the linear reference model, and $\psi'$ represents the yaw rate determined with the linear reference model.

2. A driving situation detection system according to claim 1, wherein the assessment unit contains a plurality of stability thresholds and supplies the assessment information in a stepwise manner using the stability thresholds.

* * * * *